(12) United States Patent
Mueller et al.

(10) Patent No.: US 8,463,537 B2
(45) Date of Patent: Jun. 11, 2013

(54) NAVIGATING TO A MOVING DESTINATION (75) Inventors: Jay J. Mueller, Lake in the Hills, IL (US); Matthew D. Smith, Glendale Heights, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 485 days.

(21) Appl. No.: 12/477,728

(22) Filed: Jun. 3, 2009

(65) Prior Publication Data

US 2010/0312476 A1    Dec. 9, 2010

(51) Int. Cl.
*G06G 7/78*    (2006.01)
(52) U.S. Cl.
USPC .......................................................... 701/302
(58) Field of Classification Search
USPC .......................................................... 701/302
See application file for complete search history.

(56) References Cited

U.S. PATENT DOCUMENTS

| 5,467,276 | A | 11/1995 | Tsuyuki |
| 6,816,782 | B1* | 11/2004 | Walters et al. ................. 701/426 |
| 6,871,144 | B1* | 3/2005 | Lee ................................. 701/411 |
| 7,412,325 | B1 | 8/2008 | Tannenbaum |
| 2003/0018428 | A1* | 1/2003 | Knockeart et al. ............ 701/210 |
| 2006/0195258 | A1 | 8/2006 | Kim et al. |
| 2007/0168118 | A1* | 7/2007 | Lappe et al. ................... 701/207 |
| 2008/0046173 | A1* | 2/2008 | Lappe et al. ................... 701/209 |
| 2008/0114528 | A1* | 5/2008 | Seacat et al. ................... 701/117 |
| 2009/0063046 | A1 | 3/2009 | Kim |

OTHER PUBLICATIONS

PCT International Search Report Dated Jan. 3, 2011.

\* cited by examiner

*Primary Examiner* — Rob Pond
(74) *Attorney, Agent, or Firm* — Anthony P. Curtis; Daniel R. Bestor (57) ABSTRACT

A method of navigating to a destination is provided. The method includes but is not limited to determining a target course for a moving target device using target positioning data and generating an intercept course using the target course and intercept positioning data received from an intercept device. The intercept course intersects the target course at a destination.

16 Claims, 6 Drawing Sheets

NAVIGATING TO A MOVING DESTINATION

FIELD OF THE INVENTION

The present invention relates generally to navigating to a destination. In particular, the invention relates to navigating to a moving destination.

BACKGROUND

It is known that mobile devices of all types, such as cell phones, personal digital assistants (PDAs), computers, music and video players, and motor vehicles may have positioning determining systems built into them which receive positioning signals, such as global positioning satellite (GPS) signals, in order to determine their current location. It is possible for such mobile devices to transmit their current location to devices located remotely from the mobile devices. Accordingly, some companies, such as trucking companies, install positioning determining systems, some with navigational capabilities, in vehicles and have those vehicles continually report their position to a remote location, which is often centralized. It is also known to plant a tracking device in a car or on a person in order to track the movement of the car or person. The tracking device could also continually report its position to a remote location. Moreover, as social networks are becoming increasingly popular, many people are making their position known to friends and family. As a result, mobile devices used by these people continually report their position to a remote location, which is then relayed to friends and family.

Currently, however, there is not a system for allowing a user at a remote location receiving positional information from a mobile device to predict the course that mobile device is travelling. Nor is there a system for allowing the remote user to plot a course to intercept the mobile device, particularly when either or both the user and the mobile device are in motion.

As a result, it would be desirable to provide a system and method which can predict the course that a mobile device is travelling. Additionally, it would be desirable to provide a user with a system and method which can navigate to a mobile device which is in motion.

SUMMARY

In one aspect, a method of navigating to a destination is provided. The method includes but is not limited to generating target positioning data at a moving target device and determining a target course for the target device using the target positioning data. The method also includes but is not limited to receiving intercept positioning data from an intercept device and generating an intercept course using the target course and the intercept positioning data. The intercept course intersects the target course at an intercept destination. The method also includes but is not limited to sending the intercept course to the intercept device and navigating to the destination along the intercept course with the intercept device.

In another aspect, a method of navigating to a moving destination is provided. The method includes but is not limited to continuously sending target positioning data from a moving target device to an intercept device and continuously determining a target course for the target device using the target positioning data. The method also includes but is not limited to continuously generating intercept positioning data at the intercept device and continuously generating an intercept course using the target course and the intercept positioning data. The intercept course intersects the target course at the moving destination.

In another aspect, a method of navigating to a destination is provided. The method includes but is not limited to determining a target course for a moving target device using target positioning data and generating an intercept course using the target course and intercept positioning data received from an intercept device. The intercept course intersects the target course at a destination.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

The present invention makes use of the discovery that by using positioning data from a target device and an intercept device, the intercept device can be guided to and converged upon the target device, even if the target device is moving.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

Figure 1:
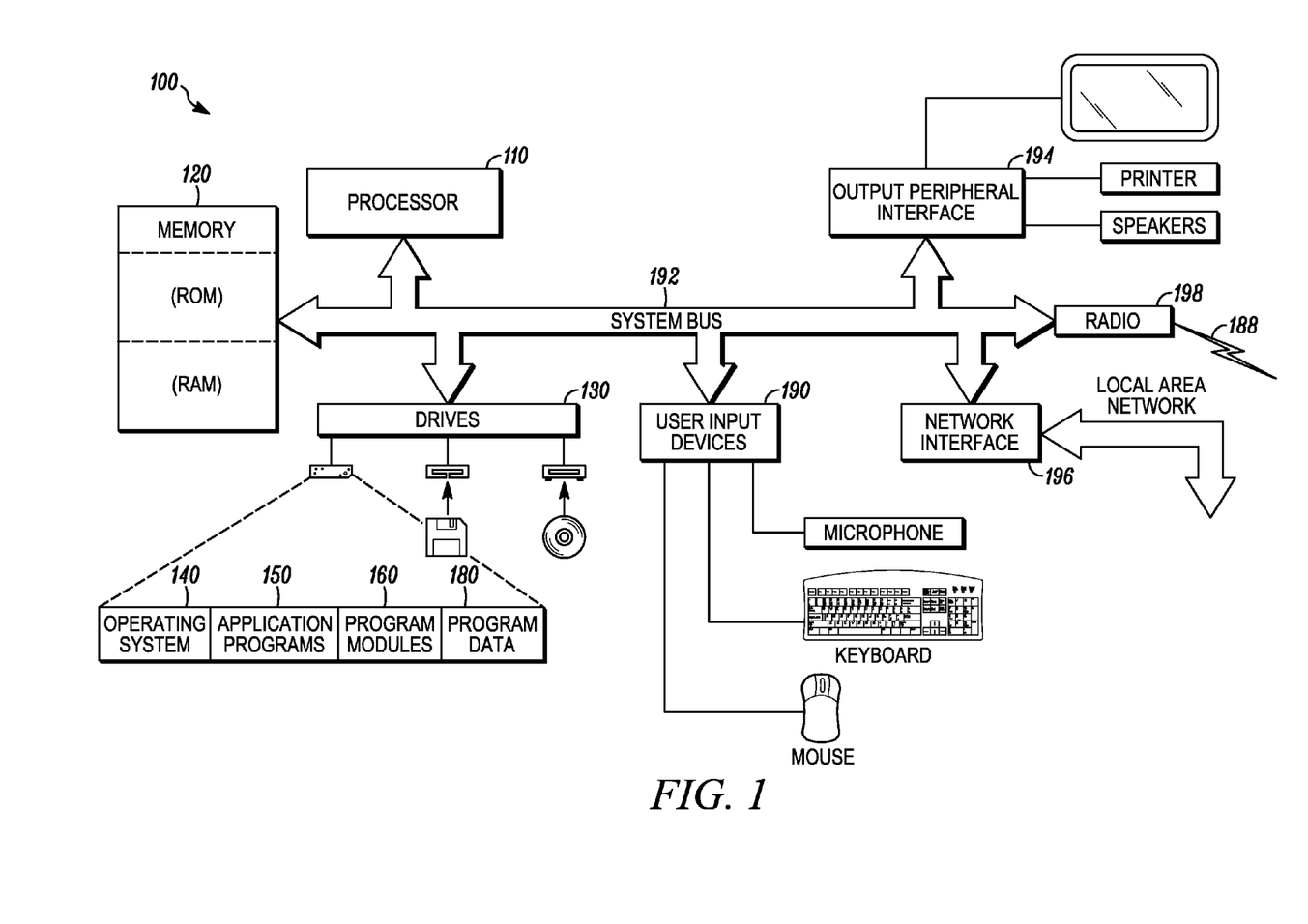
FIG. 1 depicts a block schematic diagram of an exemplary computing system, in accordance with one embodiment of the present invention.

With reference to FIG. 1, depicted is an exemplary computing system for implementing embodiments. FIG. 1 includes a computer 100, which could be any one of a target device 200, a remote device 300, or an intercept device 400. Computer 100 may be a mobile device, wherein at least some or all of its components are formed together in a single device which can move from one location to another, such as a laptop computer, a mobile telephone, a portable electronic device, or a personal digital assistant (PDA). Computer 100 may be a stationary or non-mobile device which is not moved around, such as a desktop computer or server. The computer 100 includes a processor 110, memory 120 and one or more drives 130. The drives 130 and their associated computer storage media provide storage of computer readable instructions, data structures, program modules and other data for the computer 100. Drives 130 can include an operating system 140, application programs 150, program modules 160, and program data 180. Computer 100 further includes input devices 190 through which data may enter the computer 100, either automatically or by a user who enters commands and data. Input devices 190 can include an electronic digitizer, a microphone, a camera, a video camera, a keyboard and a pointing device, commonly referred to as a mouse, trackball or touch pad. Other input devices may include a joystick, game pad, satellite dish, scanner, and the like. In one or more embodiments, input devices 190 are mobile devices that can direct display or instantiation of applications running on processor 110.

These and other input devices 190 can be connected to processor 110 through a user input interface that is coupled to a system bus 192, but may be connected by other interface and bus structures, such as a parallel port, game port or a universal serial bus (USB). Computers such as computer 100 may also include other peripheral output devices such as speakers and/or display devices, which may be connected through an output peripheral interface 194 and the like.

Computer 100 also includes a radio 198 for wirelessly transmitting and receiving data for the computer 100 with the aid of an antenna. Radio 198 may wirelessly transmit and receive data using any present wireless standard such as WiMAX™, 802.11a/b/g/n, Bluetooth™, 2 G, 2.5 G, 3 G, and 4 G. Additionally, radio 198 may receive positioning signals 188, such as global positioning satellite (GPS) signals from a global positioning satellite or cellular signals for determining its position via triangulation. By using the positioning signals 188, the radio 198 is able to determine its location.

Computer 100 may operate in a networked environment using logical connections to one or more remote computers, such as a remote computer. The remote computer may be a personal computer, a server, a router, a network PC, a peer device or other common network node, and may include many if not all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note, however, that source and destination machines need not be connected by a network or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN to environments such as the Internet. It will be appreciated that other means of establishing a communications link between the computers may be used.

According to one embodiment, computer 100 is connected in a networking environment such that processor 110 can process incoming and outgoing data, such as positioning data which contains information on the location of the radio 198, and preferably contains information on a course that the radio 198 is heading on, and the like. The incoming and outgoing data can be to and/or from a mobile device or from another data source, such as a target device 200, a remote device 300, and an intercept device 400.

Figure 2:
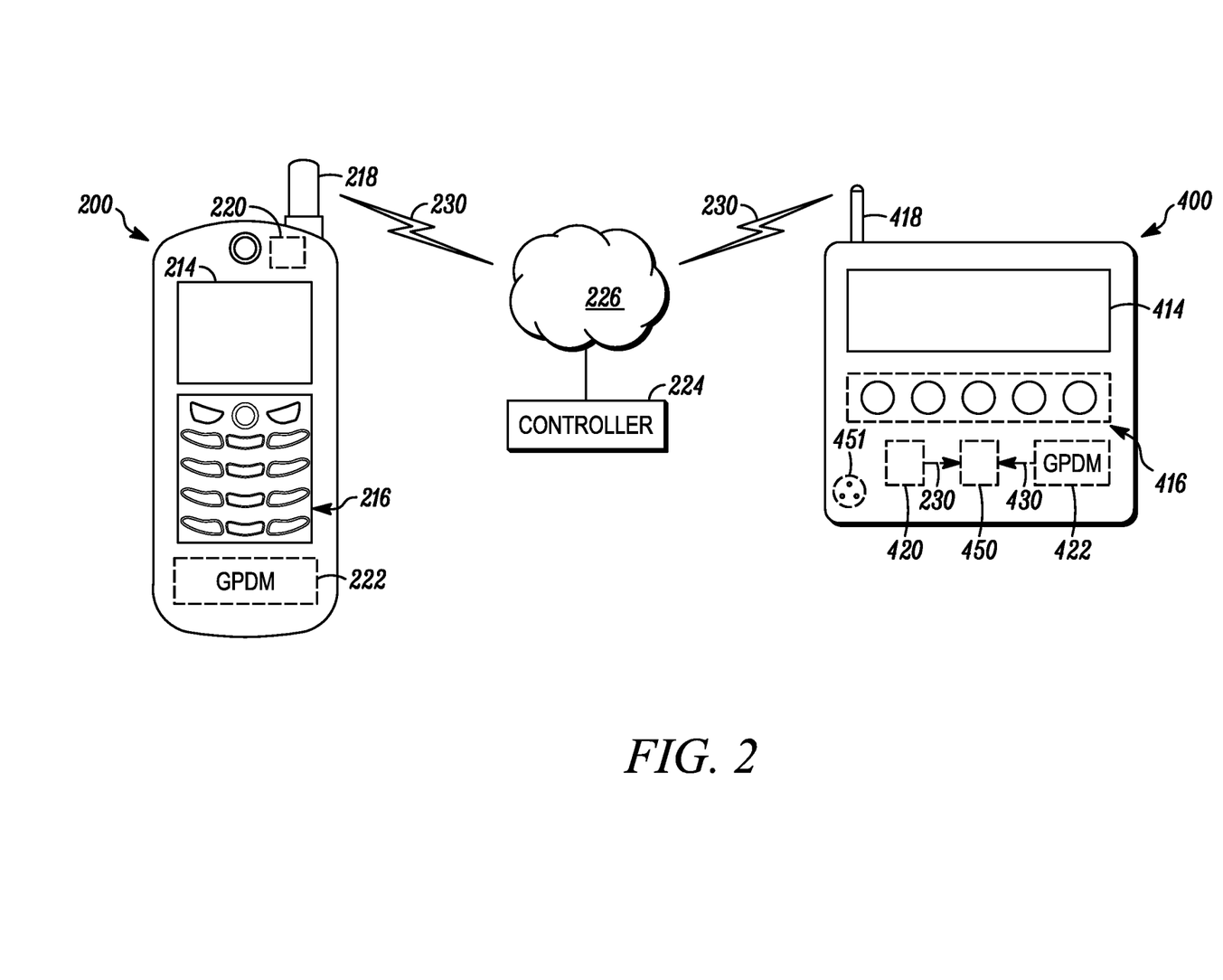
FIG. 2 depicts a schematic representation of a system for navigating to a moving device, in accordance with one embodiment of the present invention.

With reference to FIG. 2, illustrated is an exemplary representation of a system for navigating to a moving device, the system including two devices, a target device 200 and an intercept device 400, which send and receive navigational information via network 226. Network 226 can be, for example, a cellular network, (perhaps having a land line to one of the devices), a non-cellular wireless network, a wired network, or combinations thereof. Note that while only two devices 200, 400 are shown, the system is designed for communications among any number of devices, some of which are mobile and, if desired some of which may be fixed in location. Also note that while the devices 200, 400 shown in FIG. 2 are mobile telephones, devices 200, 400 may be any type of device which can receive data, such as laptop computers, tablet computers, personal digital assistants, watches, navigational devices, motorized vehicles and devices within them, desktop computers, servers, and/or any other devices that are capable of sending and receiving data. Devices 200, 400 are mobile devices that can be readily transported from one location to another personally or in a vehicle.

Target device 200 includes any device that is capable of sending and receiving data, such as computer 100. If the target device 200 is mobile and moving, its current geographical location is constantly changing. Target device 200 preferably includes a display 214 for displaying content such as images or video, a user input device 216 for inputting data from a user, an antenna 218 connected with a radio 220, and a geographical position determination mechanism 222, such as a navigational device, for determining the location of the target device 200. The geographical position determination mechanism 222 is any device which can be used to determine the current geographical location of an object, such as target device 200. The navigational device uses a GPS navigation system for determining geographical coordinates from satellite transmissions. Preferably, the navigational device can also plan courses for the target device 200 to follow. The geographical position determination mechanism 222 may also determine the geographical location of target device 200 by using data from a cellular network based upon triangulation, or other methods, employed for such determinations.

Figure 4:
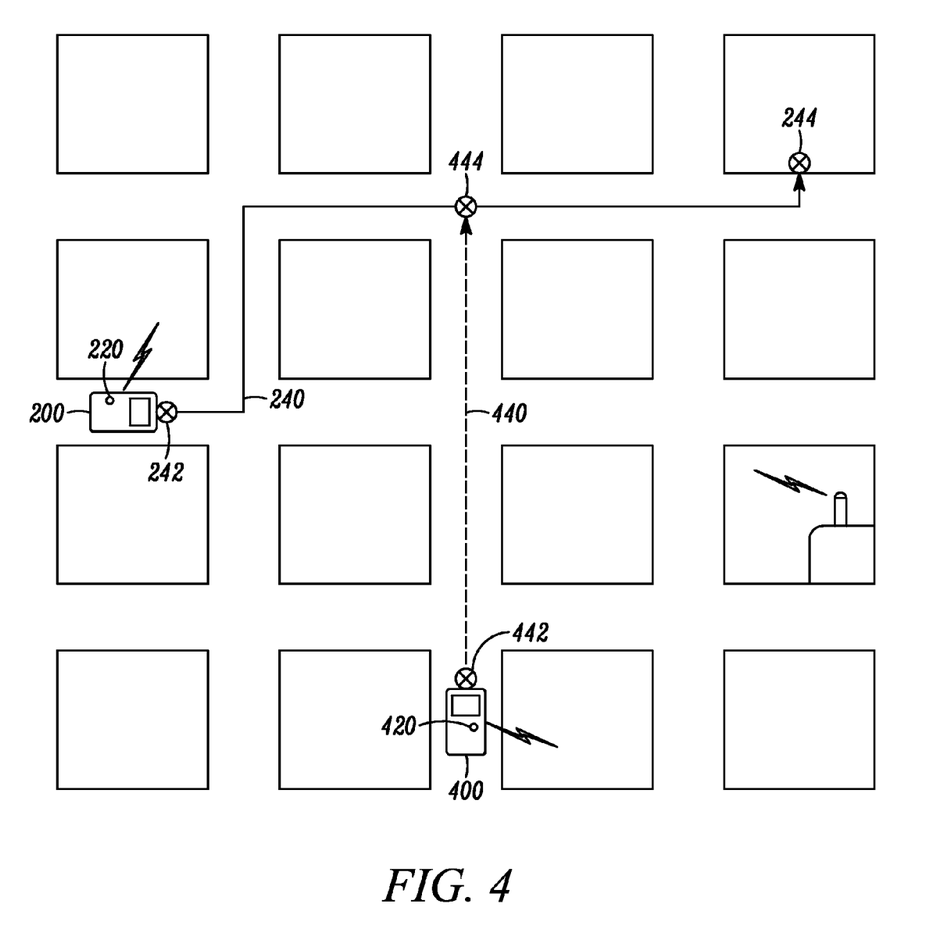
FIG. 4 depicts a schematic representation of a target device moving along a target course and an intercept device moving along an intercept course, in accordance with one embodiment of the present invention.

Upon determining the location of the target device 200, geographical position determination mechanism 222 generates target positioning data 230. Target positioning data 230 includes information about the current geographical location of the target device 200, the target position 242, and preferably, includes information about a target course 240, as shown in FIG. 4. The target position 242 can include coordinates for the target device 200, or instructions on how to locate the target device 200. The target course 240 is a plotted course for which the target device 200 is to follow. The target course 240 begins at the target position 242 and ends at a target destination 244. In one embodiment, the target positioning data 230 includes latitudinal and longitudinal coordinates for the target device 200; directional information indicating the direction that the target device 200 is moving, for example north, east, south or west; speed information indicating how fast the target device 200 is moving (provided, e.g., by an accelerometer in the target device 200), and destination information indicating the target destination 244.

Target positioning data 230 may also include navigation instructions on how to navigate to the target device 200. For example, in one embodiment, target positioning data 230 includes a single textual or graphical navigation instruction which is communicated to intercept device 400. This single navigation instruction could be, for example, turn right at the next intersection or it could be the geographical (or map) coordinates of a specified destination.

Target device 200 communicates with a network controller 224 through radio 220. Network controller 224 can optionally be disposed within target device 200. Network controller 224 is connected to network 226. Network controller 224 may be located at a base station, a service center, or any other location on network 226. Network 226 may include any type of network that is capable of sending and receiving communication signals, including signals for navigational content, images, data such as positioning data, and text.

Network 226 may include a data network, such as the Internet, an intranet, a local area network (LAN), a wide area network (WAN), a cable network, and other like systems that are capable of transmitting multimedia video, streaming video, audio and the like. Network 226 may also include a telecommunications network, such as a local telephone network, long distance telephone network, cellular telephone network, satellite communications network, cable television network and other like communications systems that interact with computers to enable set-top boxes or other audio/visual controllers to communicate media and multimedia signals. Network 226 may include more than one network and may include a plurality of different types of networks. Thus, network 226 may include a plurality of data networks, a plurality of telecommunications networks, cable systems, satellite systems and/or a combination of data and telecommunications networks and other like communication systems. In one embodiment, network 226 may be an email network or a Switched Multi-megabit Data Service (SMDS) network, with or without the SMDS Interface Protocol (SIP), using data packets for the delivery of positioning data.

Network 226 is connected with intercept device 400. Intercept device 400 includes any device that is capable of sending and receiving data, such as computer 100. The intercept device 400 is mobile and therefore capable of converging upon and intercepting the target device 200. Intercept device 400 preferably includes a display 414 for displaying content such as images or video, a user input device 416 for inputting data from a user, an antenna 418 connected with a radio 420, a geographical position determination mechanism 422, such as a navigational device, for determining the location of the intercept device 400, and a processor 450 connected with the geographical position determination mechanism 422 and the radio 420.

The geographical position determination mechanism 422 is any device which can be used to determine the current geographical location of an object, such as intercept device 400. The navigational device uses a GPS navigation system for determining geographical coordinates from satellite transmissions. Preferably, the navigational device can also plan courses for the intercept device 400 to follow. The geographical position determination mechanism 422 may also determine the geographical location of the intercept device 400 by using data from a cellular network based upon triangulation, or other methods, employed for such determinations. Upon determining the location of the intercept device 400, geographical position determination mechanism 422 generates intercept positioning data 430. Intercept positioning data 430 includes information about the current geographical location of the intercept device 400, such as the intercept position 242, as shown in FIG. 4.

Processor 450 receives intercept positioning data 430 from the geographical position determination mechanism 422 and target positioning data 230 from the geographical position determination mechanism 222 via network 226. Using target positioning data 230, processor 450 determines the target course 240 for the target device 200. The target course 240 is either provided in the target positioning data 230, or it is predicted by the processor 450 based on a plurality of target positions 242 received via target positioning data 230. Upon determining the target course 240, the processor 450 then calculates an intercept course 440, as shown in FIG. 4, using the target course 240 and the intercept positioning data 430. The intercept course 440 is the course used by the user of the intercept device 400 to converge upon the target device 200. The intercept course 440 may be, for example, the shortest physical course to the intercept destination 444. In one embodiment, the intercept course 440 is the quickest course to the intercept destination 444. Note that in some cases, due to external factors such as construction, traffic, accidents, parades and the like, the shortest physical course may not be the quickest. To make such a determination, the processor 450 may receive periodically-updated information through the connection of the intercept device 400 with the network. Note further that although processor 450 may determine the course, another device within the network may plot the course, merely sending the instructions to the intercept device 400.

The intercept course 440 intersects with the target course 240 and converges upon the target device 200 at an intercept destination 444. The intercept destination 444 is calculated and estimated by the processor 450 as the location at which the intercept device 400 will converge upon and intercept the target device 200. Since there are many variables involved in calculating the intercept destination 444, such as the speed of the intercept device 400, the speed of the target device 200, and the target course 240 of the target device, which may change many times, the intercept destination 444 often changes, and is therefore referred to as a moving destination.

Figure 3:
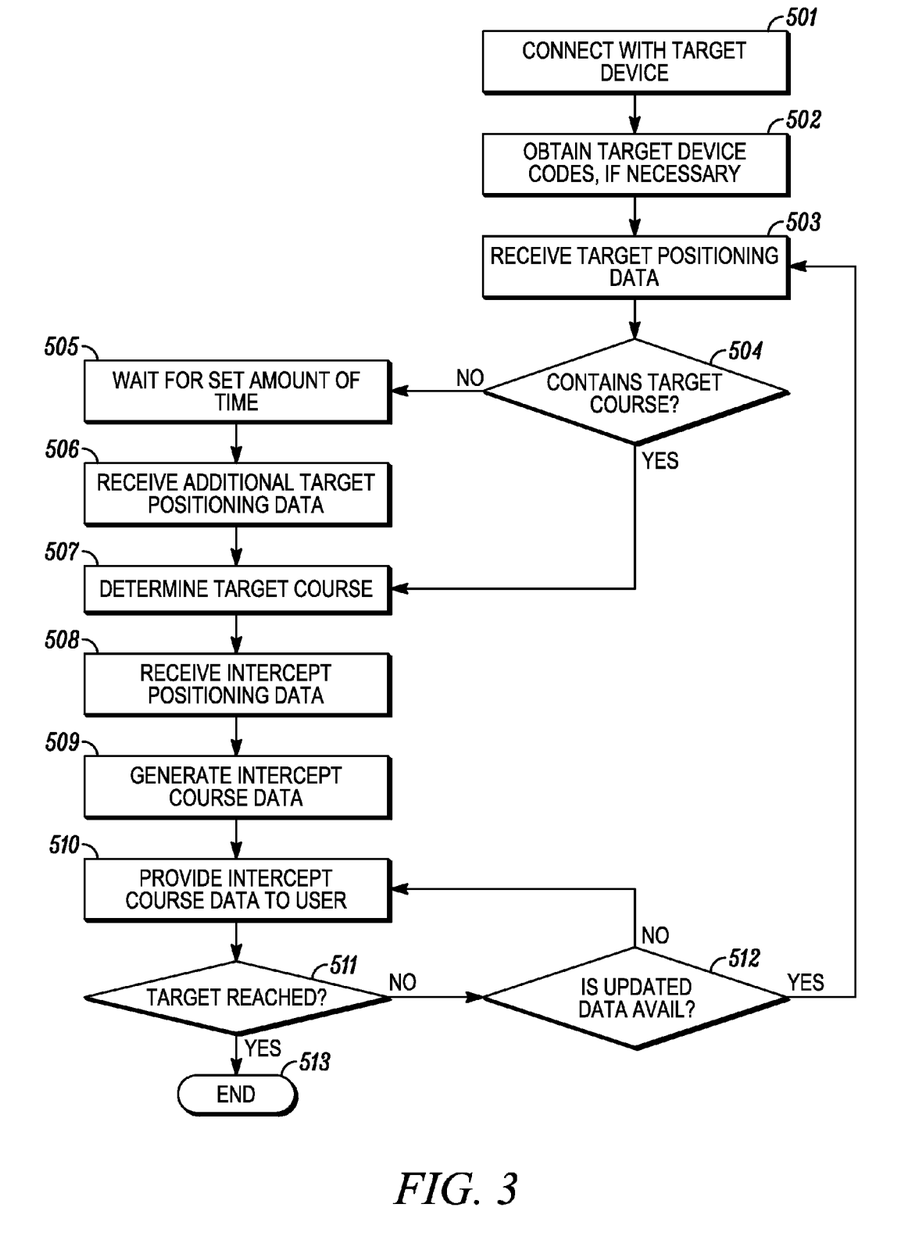
FIG. 3 depicts a flowchart illustration of methods, apparatus (systems) and computer program products, in accordance with one embodiment of the present invention.

By using method 500, the intercept device 400 is able to converge upon and intercept target device 200 even when target device 200 is moving. This capability is useful for when persons are moving around and would like to converge upon each other for a meeting without having to stay in constant audio or textual communication with each other. Additionally, this capability is useful for law enforcement when attempting to converge upon a suspect in a moving vehicle or on foot. Note that concept may also be extended to multiple intercept devices 400 to allow each intercept device 400 to be aware of the location of the other intercept devices 400 as well as the target device 200. Such an arrangement permits the intercept devices 400 to meet with each other prior to reaching the intercept destination 444 or to avoid meeting each other until they converge at the intercept destination 444 (either case meaning the processor determining the course taking into account the path of the other intercept devices 400 and adjusting appropriately using predetermined parameters if one or more of the routes of the intercept devices 400 is to be adjusted).

In one embodiment, the target positioning data 230 includes virtual intercept points which do not represent the actual location of a target device 200, but rather represent geographical locations which an intercept device 400 can be guided to. These virtual intercept points can be useful for military, law enforcement, and gaming applications.

Referring to FIG. 3 a method 500 for communicating between the target device 200 and the intercept device 400 is shown. Block 501 controls the selection by an initiating device, such as intercept device 400, of a receiving device, such as target device 200. Once the connection is established, at block 502 the devices 200 and 400 exchange protocol codes and permissions, if necessary, so that, if desired, at a future time one or either of the devices 200 and 400 can establish communications with the other via a data exchange network 226 without the traditional ringing, manual answering, etc.

Figure 5:
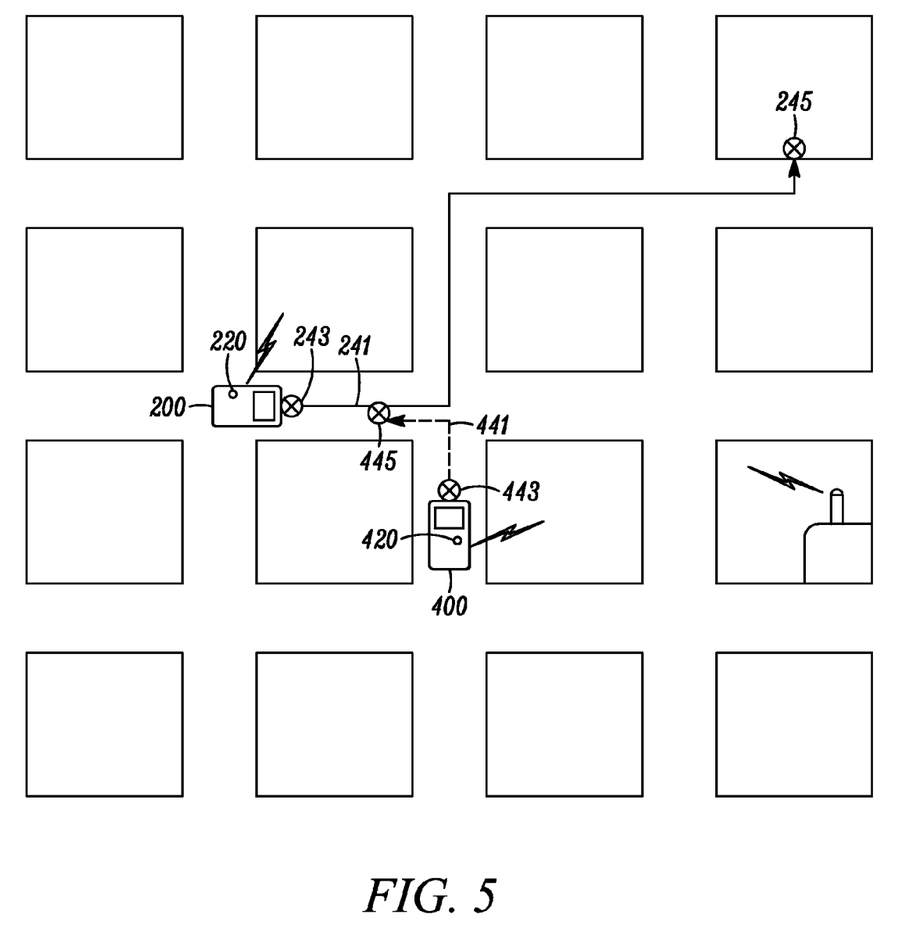
FIG. 5 depicts a schematic representation of a target device moving along an updated target course and an intercept device moving along an updated intercept course, in accordance with one embodiment of the present invention.

Moving to block 503, target device 200 sends target positioning data 230 to the intercept device 400 through network 226 and intercept device 400 then receives the target positioning data 230. The target positioning data 230 includes the target position 242 of the target device 200, and preferably, the target course 240. Moving to block 504, the method 500 then determines if the target positioning data 230 includes the target course 240 or not. If the target positioning data 230 does not include the target course 240, then the method 500 moves to block 505 and waits for a predetermined or set amount of time to pass. Then the method 500 moves to block 506, whereupon the target device 200 is queried for additional target positioning data 230, and additional target positioning data 230 is sent by the target device 200 and received by the intercept device 400 through network 226. Specifically, the additional target positioning data 230 is received by the processor 450. The additional target positioning data 230 includes an updated target position 243, as shown in FIG. 5. The updated target position 243 is a more current geographical position of target device 200 than the original target position 242 and can be used in conjunction with the original target position 242 in order to predict the target course 240 if it is not provided by the target device 200.

Moving to block 507, the processor 450 then determines the target course 240. If the target course 240 is contained within the target positioning data 230, then the processor 450 uses the real target course 240 contained within contained within the target positioning data 230. However, if the target course 240 is not contained within the target positioning data 230, then the processor 450 predicts the target course 240 using the updated target position 243 in conjunction with the original target position 242. For example, using the updated target position 243 in conjunction with the original target position 242, the processor 450 can determine the speed of the target device 200 in addition to its heading. In this manner, the processor 450 can predict where the target device 200 will be after a set period of time, and use this predicted position as the target destination 244, and plot a predicted target course 240 using the updated target position 243 and the predicted target destination 244. Upon determining the target course 240, either real or predicted, the target course 240 is then sent to and received by the processor 450.

At block 508, the intercept device 400, and specifically, the geographical position determination mechanism 422, generates intercept positioning data 430 which includes the intercept position 442 of the intercept device 400. The intercept positioning data 430 is then received by the intercept device 400, and specifically, the processor 450. Upon receiving both the intercept positioning data 430 and the target course 240, the processor 450 then generates intercept course data 432 which includes the intercept course 440. The intercept course 440 intersects with the target course 240 and converges upon the target device 200 at an intercept destination 444. The intercept course data 432 is then provided to the user, at block 510, by outputting the data on an output device, such as display 414 or transducer 451. Using the intercept course 440, the user is then able to converge upon and intercept the target device 200. In one embodiment, the intercept course 440 is generated so as to be a parallel course to the target course 240, so as to avoid a line of sight between the intercept device 400 and the target device 200.

The method 500 then continues to block 511, whereupon the method 500 determines whether or not the target device 200 has been reached. At this point, distance alerts can be generated by the processor 450 which indicate to a user the distance between the target device 200 and the intercept device 400. The distance alerts can help the user understand that he is getting either farther away from or closer to the target device 200. If the intercept position 442 is at or near the intercept destination 444 or the target position 242, then the method 500 concludes and moves to block 513. However, if the intercept position 442 is not at or near the intercept destination 444 or the target position 242, then the method 500 moves to block 512.

At block 511, the method 500 determines if updated data, such as updated target positioning data 231 or updated intercept positioning data 431 is available or not. Updated target positioning data 231 includes an updated target position 243, and possibly an updated target course 241 having an updated target destination 244. The updated target position 243 is a more current geographical position of target device 200 than target position 242. Additionally, the updated target course 241 is a more current course for target device 200 than target course 240. Updated target course 241 may contain the same target destination 244, or an updated target destination 245, which is more current, as shown in FIG. 5. Updated intercept positioning data 431 includes an updated intercept position 442, which is a more current geographical position of intercept device 400 than intercept position 442. If updated data is available, then the method 500 moves to block 503, whereupon the method proceeds to block 509, and generates updated intercept course data 432 with an updated intercept course 441.

If updated data is not available, then the method 500 moves to block 510 and continues to provide intercept course data 432 to the user. Intercept course data 432 is provided to the user until the user either manually cancels the intercept request embodied in the method 500 or the intercept device 400 reaches the intercept destination 444, or some updated intercept destination 445.

Using the system and method described herein, a person with a mobile device, such as intercept device 400, can establish a communication link to a selected other party's device, the target device 200, which can be, for example, a moving automobile. Once the communication link between the intercept device 400 and the target device 200 is established, the intercept device 400 communicates to the called party's device, the target device 200, a desire for the called party's current location, and current heading or course. The called party's device, the target device 200, can then send one or more different types of target positioning data 230 in return. The simplest data would include first and second coordinates for the target device 200, for example a moving automobile, wherein the first coordinate is generated in time before the second coordinate. Additionally, just a first coordinate and a heading or a course can also be provided. Once the target positioning data 230 is received by the original calling party's device, the intercept device 400, navigational processing within the intercept device 400 can calculates an intercept course 440 to the called party and the called party's device, the target device 200.

If the calling party's device, the intercept device 400, does not contain navigation processing capability then the calling party could be sent a list of navigational instructions based upon the current position of the called party. These navigational instructions can be generated by and sent from the target device 200 or some other remote device. These navigational instructions are then made available to the calling party. In this manner, the calling party can track and intercept the called party, even when the called party is on the move.

Figure 6:
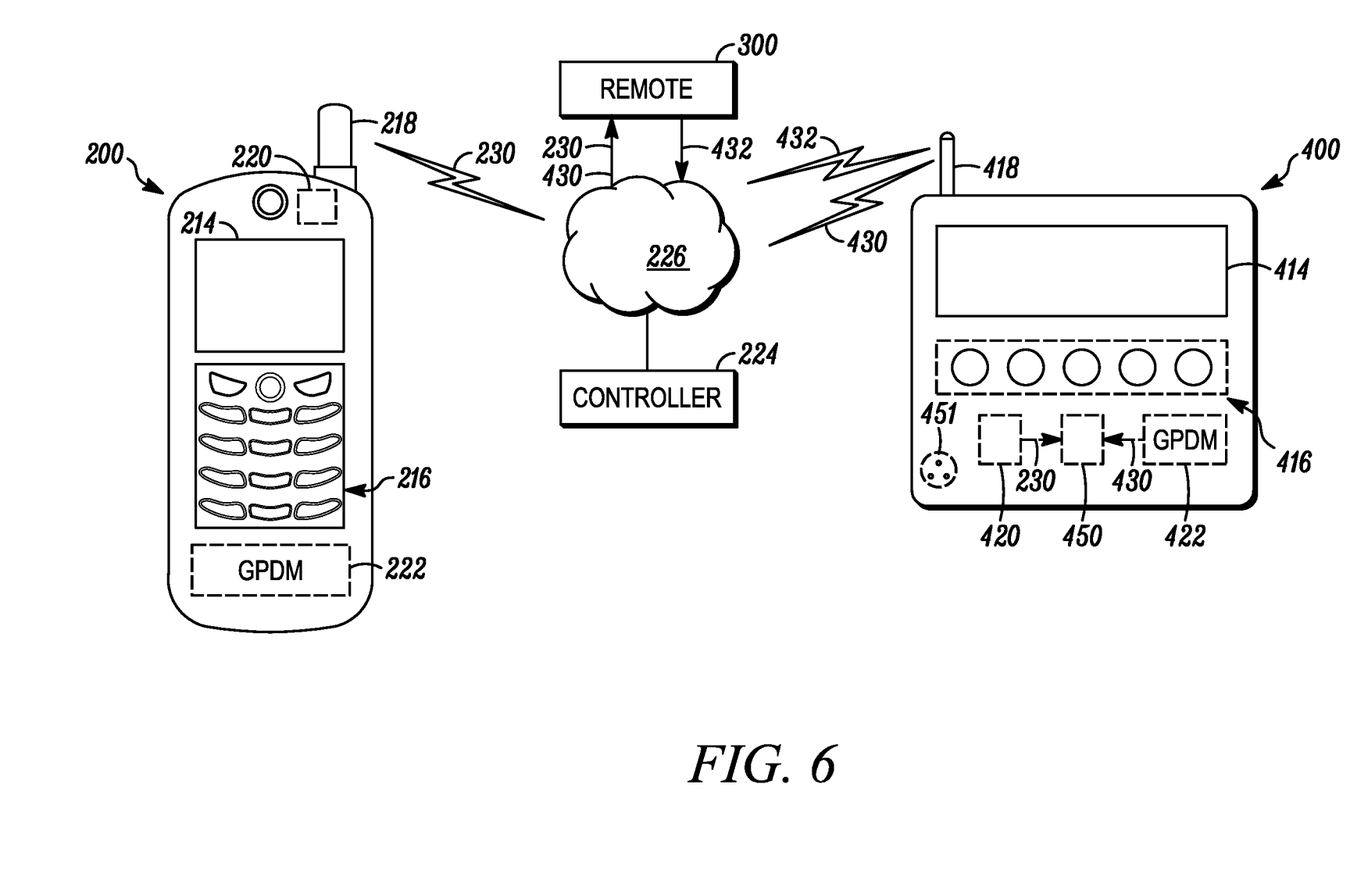
FIG. 6 depicts a schematic representation of a system for navigating to a moving device, in accordance with one embodiment of the present invention.

With reference to FIG. 6, in one embodiment, the system for navigating to a moving device includes a remote device 300 connected with the network 226, wherein the remote device 300 receives the target positioning data 230 and the intercept positioning data 430, and generates intercept course data 432 using the target positioning data 230 and the intercept positioning data 430. The remote device 300 can offload certain tasks which would normally be conducted by processor 450. Remote device 300 is any computer, including mobile devices such as mobile computers, capable of interacting with one or more other computers. Remote device 300 also includes non-mobile devices, such as desktop computers and computer servers. Upon generating intercept course data 432, the remote device 300 then would communicate the intercept course data 432 to the intercept device 400.

In one embodiment, method 500 is continuously repeated, wherein the target device 200 continuously generates and sends target positioning data 230, the intercept device 400 continuously generates and sends intercept positioning data 430, and the intercept device 400 or the remote device 300 continuously determines a target course 240 for the target device 200 using the target positioning data 230 and continuously generates an intercept course 440 using the target course 240 and the intercept positioning data 430. Preferably, the method 500 is repeated at least once every minute, and more preferably, at least once every thirty seconds, and most preferably, at least once every ten seconds. The target course 240 may be continuously predicted using target positioning data 230 such as speed information and directional information. The updates may also be triggered when a change of a particular parameter, e.g., speed or direction, over a predetermined threshold is determined. Alternately or in addition, the updates can be triggered by parameters such as the relative distance between the target and interception devices (e.g., as the relative distance decreases, the update period decreases).

In one embodiment, in addition to generating intercept course data 432, either intercept device 400, and specifically processor 450, or the remote device 300 calculate additional parameters which help to guide a user of intercept device 400 to the target device 200. The additional parameters include a distance from the intercept device 400 to the target device 200, a rate of change in distance from the intercept device 400 to the target device 200, and an estimated time of arrival to the intercept destination 444.

In various embodiments, the target device 200 may be aware of and perhaps take an active role in the interception, such as in social networking situations. In other embodiments, the target device 200 may not be aware of the interception, such as in interceptions by law enforcement. In these latter embodiments, passive methods of providing the location of the target device 200 are employed and the target device 200 is provided no information about the interception device 400 or the interception that is to occur.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computers), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A method of navigating, by an intercept device, to an intercept destination to intercept a moving target device, the method comprising:
   receiving, by an intercept device, target positioning data, generated at a moving target device, from the moving target device, the target positioning data including at least (i) a current geographic location of the moving target device and (ii) an intended destination geographic location of the moving target device;
   generating, by the intercept device, intercept positioning data; and
   locally generating, by the intercept device, a predicted target course using the current geographic location of the moving target device and the intended destination geographic location of the moving target device, and using the predicted target course and the generated intercept position data to generate an intercept course, wherein the intercept course intersects the target course at an intercept destination, the intercept destination different from the intended destination geographic location.

2. The method of claim 1, wherein the intercept device uses the intercept course to provide navigation directions to the intercept destination.

3. The method of claim 1, further comprising:
   receiving updated target positioning data, generated at the moving target device, from the moving target device;
   generating updated intercept positioning data at the intercept device; and
   locally generating an updated predicted target course using an updated current geographic location of the moving target device and an updated intended destination geographic location of the moving target device, and using the updated predicted target course and the updated generated intercept position data to generate an updated intercept course, wherein the updated intercept course intersects the updated target course at an updated intercept destination.

4. The method of claim 1, further comprising calculating and displaying one of a distance from the intercept device to the target device, a rate of change in distance from the intercept device to the target device, and a time of arrival to the intercept destination.

5. The method of claim 1, wherein the target positioning data includes (i) latitudinal and longitudinal coordinates of the current geographic location, (ii) latitudinal and longitudinal coordinates of the intended destination geographic location, and (iii) further information indicative of at least one of directional information and speed information.

6. The method of claim 5, wherein the further information indicative of at least one of directional information and speed information is information reflecting a detected direction and speed of the moving target device.

7. The method of claim 5, wherein the further information indicative of at least one of directional information and speed information is a second pair of latitudinal and longitudinal coordinates of a subsequent current geographic location of the target device, from which direction and speed information can be inferred by comparison with the first pair of latitudinal and longitudinal coordinates of the current geographic location of the target device.

8. The method of claim 1, wherein the intercept course is the shortest course to the intercept destination.

9. The method of claim 1, wherein the intercept course is the quickest course to the intercept destination.

10. The method of claim 1, wherein the generating of the intercept course is conducted at the intercept device.

11. The method of claim 1, wherein the intercept course is generated so as to be parallel to the target course and so as to avoid a line of sight between the intercept course and the target course.

12. A wireless mobile computing intercept device comprising:
   a memory;
   a wireless radio; and
   a processor configured to:
      receive, via the wireless radio, target positioning data, generated at a moving target device, from the moving target device, the target positioning data including at least (i) a current geographic location of the moving target device and (ii) an intended destination geographic location of the moving target device;

generate intercept positioning data; and locally generate a predicted target course using the current geographic location of the moving target device and the intended destination geographic location of the moving target device, and use the predicted target course and the generated intercept positioning data to generate an intercept course, wherein the intercept course intersects the target course at an intercept destination, the intercept destination different from the intended destination geographic location.

13. The intercept device of claim 12, further configured to calculate and display, on a display of the computing device, one of a distance from the intercept device to the target device, a rate of change in distance from the intercept device to the target device, and a time of arrival to the intercept destination.

14. The intercept device of claim 12, wherein the target positioning data includes (i) latitudinal and longitudinal coordinates of the current geographic location, (ii) latitudinal and longitudinal coordinates of the intended destination geographic location, and (iii) further information indicative of at least one of directional information and speed information.

15. The intercept device of claim 14, wherein the further information indicative of at least one of directional information and speed information is information reflecting a detected direction and speed of the moving target device.

16. The intercept device of claim 14, wherein the further information indicative of at least one of directional information and speed information is a second pair of latitudinal and longitudinal coordinates of a subsequent current geographic location of the target device, from which direction and speed information can be inferred by comparison with the first pair of latitudinal and longitudinal coordinates of the current geographic location of the target device.

* * * * *